United States Patent

[11] 3,570,505

| | | |
|---|---|---|
| [72] | Inventor | Max Randall<br>525 Longview Road, South Orange, N.J. 07079 |
| [21] | Appl. No. | 830,953 |
| [22] | Filed | June 6, 1969 |
| [45] | Patented | Mar. 16, 1971 |

[54] APPARATUS FOR CLEANING ARTICLES OF MANUFACTURE
21 Claims, 17 Drawing Figs.

[52] U.S. Cl. .................................................. 134/72
[51] Int. Cl. .................................................. B08b 3/00
[50] Field of Search .......................................... 134/72

[56] References Cited
UNITED STATES PATENTS

| 2,137,479 | 11/1938 | Dinley ........................... | 134/72 |
| 2,250,238 | 7/1941 | Smith ............................ | 134/72 |
| 3,262,460 | 7/1966 | Huddle et al. ................. | 134/72 |

*Primary Examiner*—Patrick D. Lawson
*Attorney*—Irving Seidman

ABSTRACT: This disclosure is directed to an apparatus for cleaning articles of manufacture, e.g., cans which are carried or resting freely in quantity on a conveyor belt moving at a high rate of production through a zone of high-pressure sprays up to 60 p.s.i. To maintain the articles in position on the conveyor a traveling holddown means is moved in synchronization with the conveyor to contain the discrete articles between the moving conveyor and traveling holddown means. The arrangement is such that the holddown elements or means are rendered individually self-adjusting to the size of the particular articles being transported on the conveyor and/or rendered adjustable as a unit.

Patented March 16, 1971

INVENTOR.
MAX RANDALL
BY
Irving Seidman
ATTORNEY

FIG. 2

INVENTOR.
MAX RANDALL

FIG. 3

INVENTOR.
MAX RANDALL

FIG. 4

INVENTOR.
MAX RANDALL

Patented March 16, 1971

INVENTOR.
MAX RANDALL

INVENTOR.
MAX RANDALL

APPARATUS FOR CLEANING ARTICLES OF MANUFACTURE

PROBLEM IN THE ART

In the mass manufacturing of many products, and particularly in the mass production of metallic goods, e.g., cans, it is imperative that such products be subjected to a cleaning or degreasing operation both internally and exteriorly so as to prepare the article for the next succeeding operation, such as lithographing and decorating. It is also imperative that such articles be cleaned at a rate compatible with the production rate of such cans. Accordingly, a production rate up to 1,000 articles per minute is not uncommon.

Generally, such products, e.g., metallic cans were cleaned by transporting a plurality of discrete cans on a traveling conveyor through a zone in which the cans were subjected to high intensity sprays of cleaning fluid and air blowoff for the removal of excess chemicals. However, in such an operation it has been noted that due to high production rates of the moving conveyor and/or the intensity of the high-pressure sprays and/or air blowoff turbulence that considerable difficulty had been encountered for maintaining the relatively lightweight can in a vertical position so as to prevent jamming, overturning and/or incomplete cleaning.

To obviate these problems various efforts had been made and proposed in the past to maintain the cans in an upright or vertical position during their transport through the zone of high-pressure spraying. These prior known devices generally composed of various types of holding means or devices which firmly engaged or pressed a portion of the article to prohibit tipping during the movement or transport on the conveyor. However, experience has shown that such holding means frequently applied on the article tend to damage the cans, particularly the feathered edges of cans made of aluminum or the like. Also such means frequently prevented portions of the cans covered thereby from being cleaned by spray fluids. Still a more serious problem resided in the provision that such known devices were not suitable to operate on varying sized articles. That is, that when such apparatus were set up for operating on a particular size can or article, extreme difficulty was encountered in adapting the apparatus to different size cans. For this reason much lost time, and considerable effort and labor was required to adapt such cleaning apparatus to handle various sized cans.

Magnetic holding means have also been employed. However, such holding means have limited application since the articles or cans being cleaned were required to be formed of a material having magnetic properties. Accordingly, magnetic holding means are not applicable for cleaning articles or cans of a nonmagnetic material. Also hydrostatic means have also been employed. However, such means had the disadvantage of upsetting the cans and adversely effected the speed and/or rate of production of the cleaning operation. Also it was difficult, if not impossible, to balance the hydrostatic pressure operating on a moving line of articles or cans passing through the cleaning operation so as to prohibit overturning or jamming of the cans.

OBJECTS

An object of this invention is to provide an improved apparatus for cleaning articles, e.g., metallic cans wherein the apparatus is automatically adjusted to a given range of can sizes by free-floating holding elements.

Another object is to provide a cleaning apparatus in which the articles to be cleaned, e.g., cans, are discretely supported and transported through a zone of high-pressure sprays and/or air blowoff at a relatively high production rate, e.g., 800 to 2,000 cans per minute.

Another object is to provide an arrangement in which the discrete articles are positive maintained in position on a moving conveyor at a high rate of production so as to permit all surface areas of the article to be exposed to the cleaning sprays.

Another object is to provide a cleaning apparatus in which the article holding means are rendered individually adjustable and/or adjustable as a unit to accommodate varying size articles.

Another object is to provide an arrangement of an improved holding means which can be readily adapted without resorting to internal renovation of a washing or cleaning machine and in which all adjustments can be externally made.

Another object is to provide an improved holddown assembly which can be assembled and disassembled from a washing or cleaning machine as an integral assembly thereby greatly facilitating the assembly, repair, replacement and/or maintenance thereof.

Another object is to provide an improved holddown assembly for use in a washing machine in which the assembly is supported so as to not be effected by the expansion and contraction of the supporting walls of the washing apparatus.

Another object is to provide an improved air blowout for producing a straight laminar airflow for more than one diameter of the article.

Another object is to provide a floating bearing assembly for effecting adjustment of the tension of the holddown conveyor chain from the outside of washing or cleaning machine.

Another object is to provide a floating shaft seal assembly whereby the shaft can be adjusted vertically for variation in can height and which seal assembly is also coadjusted with the floating bearing when adjusting for holddown conveyor tension.

Another object is to effect precise synchronization of the speed of the carrier conveyor with that of the holddown.

BRIEF SUMMARY OF INVENTION

The foregoing objects, other features and advantages are attained by an apparatus comprising a housing which defines a cleaning tunnel through which the articles to be cleaned are transported. The housing is generally opened at each end with an endless carrier conveyor disposed therein for transporting the articles therethrough. The conveyor preferably comprises a perforated or wire mesh belt. At an intermediate point within the housing there is provided a series of high- and low-pressurized cleaning sprays which direct the cleaning fluid at the articles as they are being transported through one or more spray zones within the housing. Thus the articles are loaded on the conveyor at one end and are carried through the various cleaning operations of the housing and are discharged at the opposite end.

In accordance with this invention a holddown means is provided to maintain the discrete, separate or independent articles being transported through the spray zones in an upright position. The holddown means comprises a pair of spaced apart endless carriers or chains having an upper and lower flight portion which are adjustable on a frame which is adapted to be detachably and vertically mounted within the housing. Interconnected between the respective flight portions of the carriers or chains are a plurality of transversely extending holding grid elements. Each grid element is constructed so as to be connected between the opposed carriers or chains and rendered vertically self-adjusting with respect thereto and the articles on the carrier conveyor. This is attained by providing each holding grid element with opposed end brackets having a slot formed therein for accommodating the bearing pin carried at spaced intervals along the respective flights of the carrier or chain. Accordingly, each holding grid on the lower flight of the carrier means is freely suspended to render it self-adjusting as it engages the top of the cans. Alternately the entire assembly of the carrier or chain and associated grid elements can be rendered adjustable as an entire unit. The suspension clearance of each grid element has a limited rotation displacement so that adjacent cans of different lengths can be accommodated without crushing the article, e.g., a can and/or jamming the cans between the lower conveyor and the holddown assembly.

FEATURES

A feature of this invention resides in the provision of a holding means which is detachably connected as a unit within the housing so as to facilitate assembly, maintenance and/or repair of the apparatus.

Another feature resides in the provision of holddown means carried at spaced intervals along the length of a carrier which are rendered self-adjusting.

Another feature resides in the provision of a holding grid defined by end brackets having a slot formed therein accommodating a bearing pin from which the grid is suspendedly connected.

Another feature resides in the provision of a limiting means for controlling or adjusting the vertical suspension of the respective holding grid.

Another feature resides in the provision in the lateral freedom of movement of the grid elements which aid in preventing damage to the articles or cans when the spray forces tend to laterally displace the cans or articles.

Other features and advantages will become more readily apparent when considered in view of the drawings and specifications in which:

Figure 1:
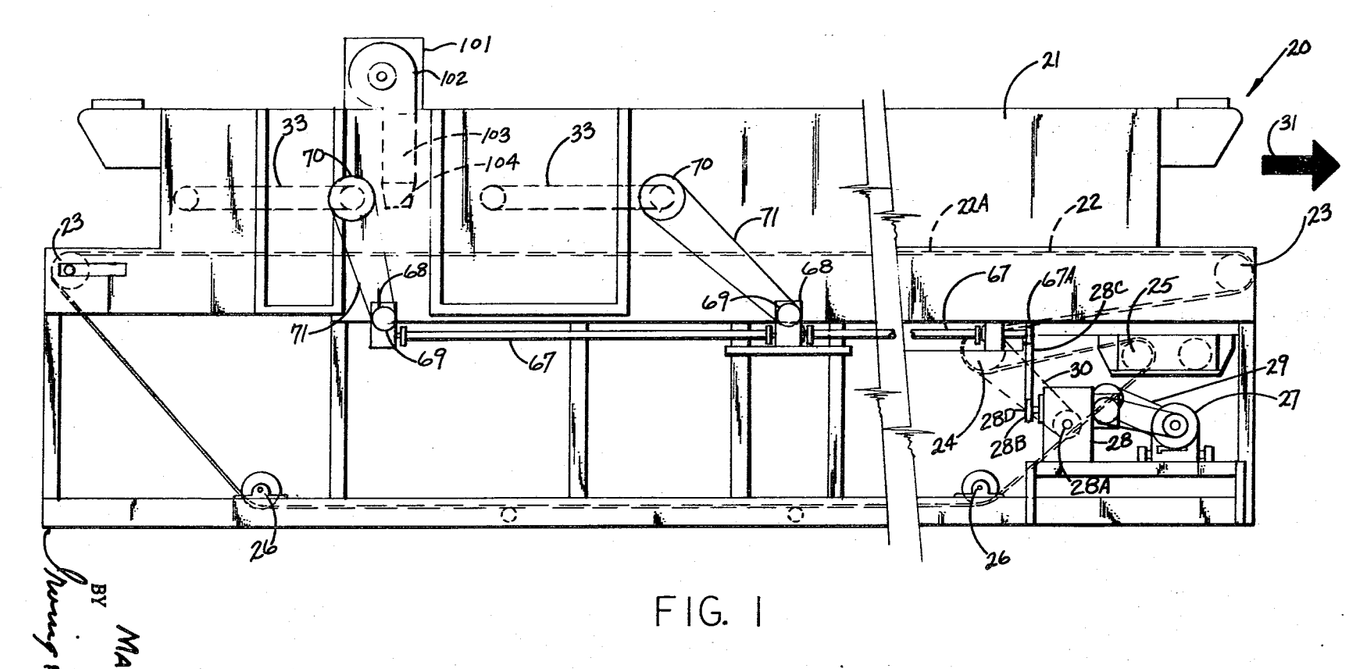
FIG. 1 illustrates a side elevation view of a fragmentary portion of the cleaning apparatus of this invention.
Figure 2:
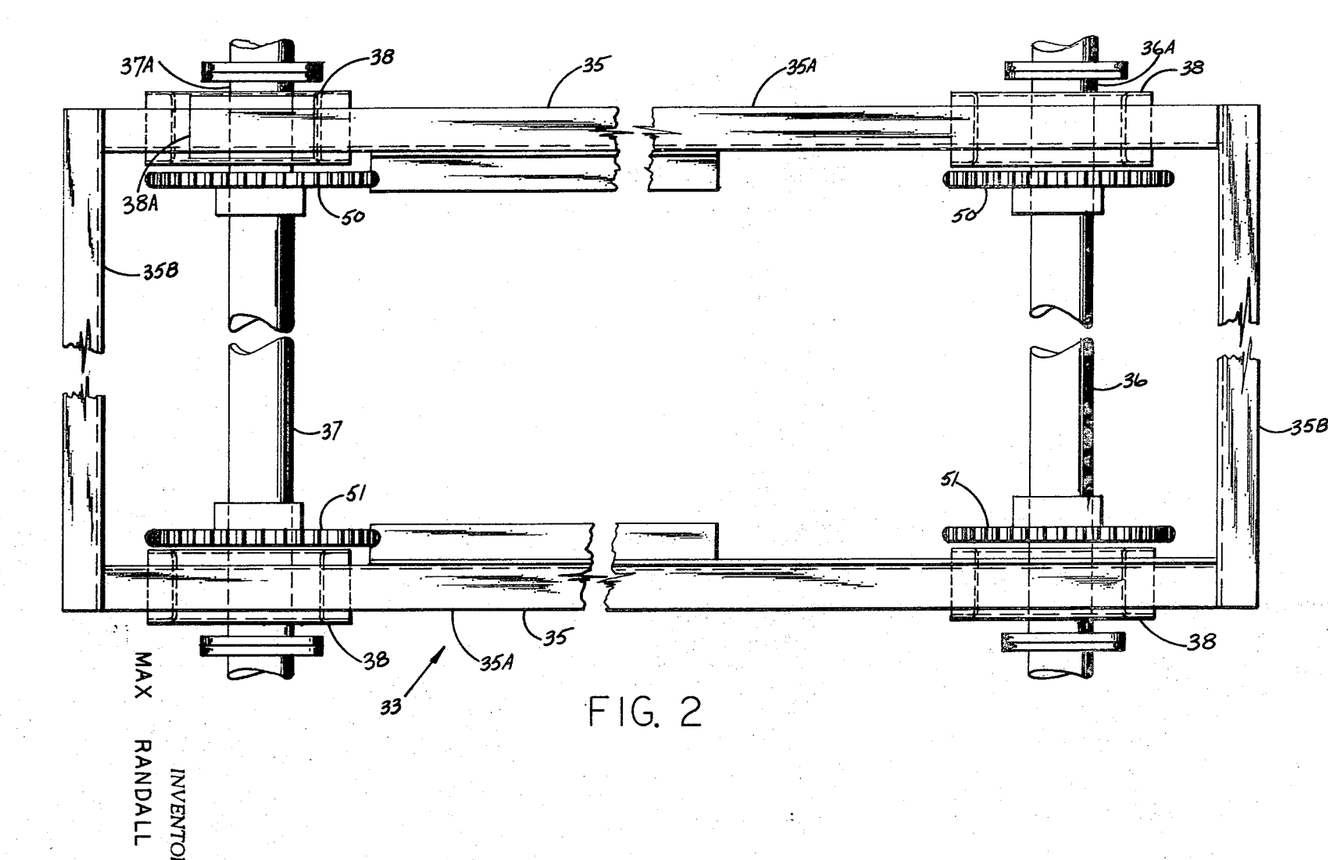
FIG. 2 is a plan view of the frame construction for supporting the holddown means of the present invention.
Figure 3:
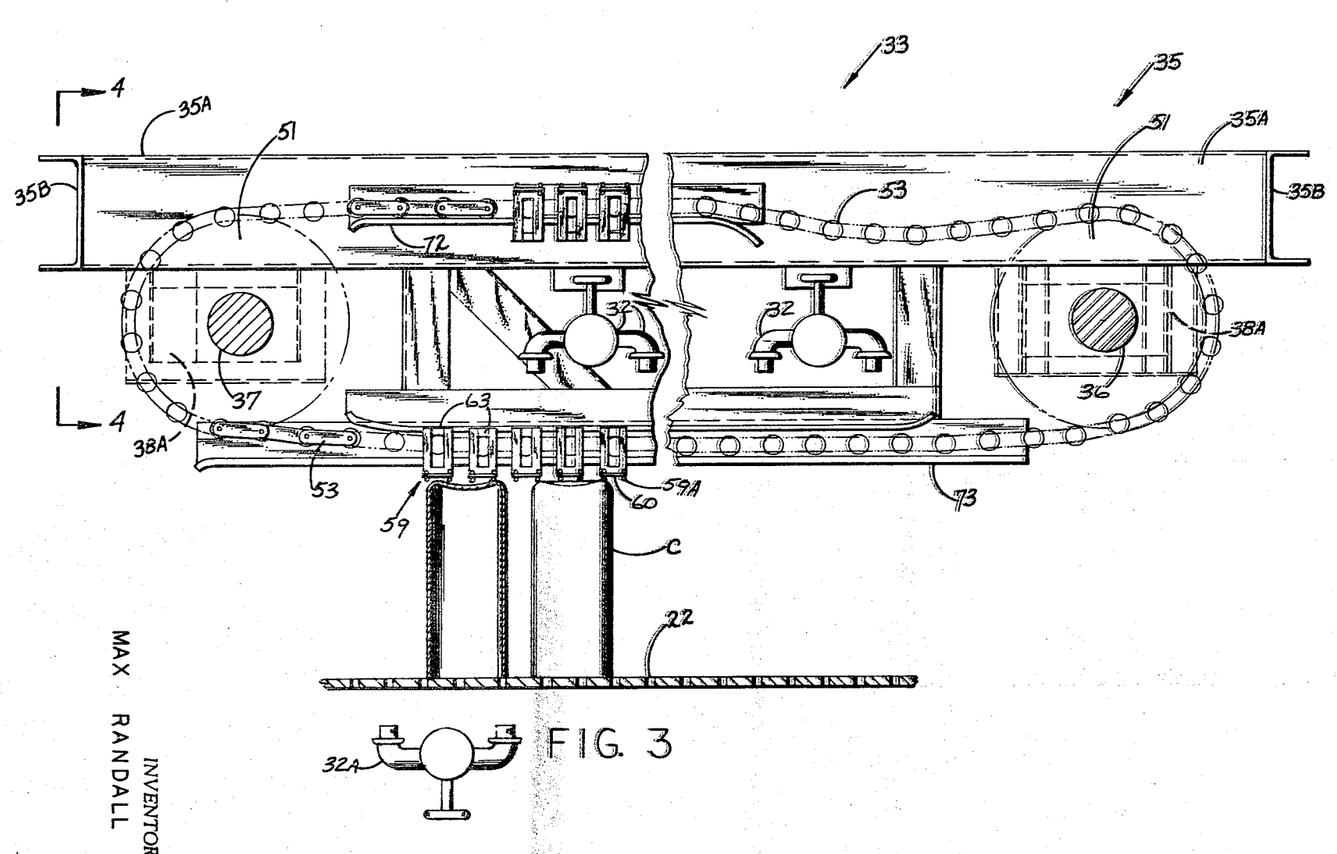
FIG. 3 is a side elevation view of the frame and holddown construction of FIG. 2 illustrated in part schematically.

Referring to the drawings and more particularly to FIGS. 1 to 3, there is illustrated an apparatus 20 of this invention for cleaning various articles of manufacture. The illustrated apparatus 20 is particularly adapted for cleaning metallic articles such as cans and the like to prepare them for the subsequent manufacturing operations, e.g., lithographing or decorating. The apparatus 20 comprises a housing 21 to define a cleaning tunnel which is opened at both ends. An endless conveyor 22 for transporting the articles or cans is disposed within the housing 21. The endless conveyor 22 comprises essentially of a perforated or flat wire mesh belt conveyor which is suitably threaded about opposed end rollers or sprockets 23 rotatably journaled adjacent the respective open ends of housing 21. The upper flight 22A of conveyor 22 thus defines the supporting surface for the articles or cans being transported through the tunnel housing during a cleaning operation.

Referring to FIG. 1 the discharge end portion of the conveyor 22 is suitably threaded over end rollers 23 with an extended portion thereof being threaded about a driving roller 24 and thereafter about tension roller 25 and lower guide rollers 26. The means for effecting the drive of the conveyor 22 comprises a motor 27, the output shaft of which is suitably connected in driving relationship to a suitable reduction unit 28 by a belt drive 29. The reduction unit is of a type having two geared outputs 28A, 28B. One output 28A of unit 28 is connected in driving relation to the conveyor driving roller 24 by a drive belt or chain 30. The other output 28B is connected in driving relationship with the holddown assembly or means 33 as will be hereinafter described by a belt drive 27C. As best seen in FIG. 1 the holddown assembly is synchronized to the drive shaft 67 of the holddown assembly 33 by a positive chain drive 28C meshing about sprocket 67A journaled to shaft 67 and sprocket 28D of output 28B. Thus when the motor 27 is actuated, the drive roller 24 drives the conveyor 22 and the holddown means 33 in synchronization from the inlet opening of the tunnel to the outlet opening as indicated by arrow 31. With the arrangement described the articles to be cleaned are fed through the inlet open end of the housing and placed on the conveyor 22 by which they are carried through the cleaning or spray zone of the tunnel housing 21. To render the apparatus 20 compatible to the high rate production of the articles to be cleaned, as for example, metallic cans, the articles are simply fed in their loose independent or discrete form onto the conveyor 22.

Disposed within the cleaning zone of the tunnel are a plurality of high intensity jet sprays 32 and 32A for directing high-pressure jet streams of a cleaning fluid toward the cans or articles C. If desired the spray may be directed toward the can from both below and above the articles or cans C. In this manner the cans may be effectively cleaned or degreased of manufacturing oils, dirt, grit, etc. In the illustrated form of the invention it is preferred that if the articles comprise cans that they be positioned on the conveyor in an inverted position.

To prohibit the cans from jamming as may be occasioned if the cans become upset in their travel through the tunnel housing, the holddown means 33 is provided to insure the retention of cans in their respective upright inverted position on the conveyor.

Referring more particularly to FIGS. 2 and 3, the holddown means 33 of this invention is constructed as a modular unit so as to facilitate repair or replacement and also to simplify the problems of alignment, adjustment, maintenance and/or cleaning required in an apparatus of this type. The holddown means 33 is further constructed and arranged so that the individual holding grids, or elements, adapted to engage or hold the cans in position on the conveyor 22, are rendered self-adjusting to various can sizes falling within a predetermined range of sizes which are transported through the housing 21. Also adjustable bearing means 34 are provided for rendering the entire holddown unit 33 vertically adjustable relative to the surface 22A of the conveyor 22.

Referring more specifically to FIGS. 2 and 3, the holddown means 33 comprises a frame 35 formed of rectangularly disposed structural members 35A and 35B. Adjacent the opposed ends of the frame 35 is a transversely extending shaft 36, 37 which is suitably journaled in an adjustably mounted bearing 38.

Figure 4:
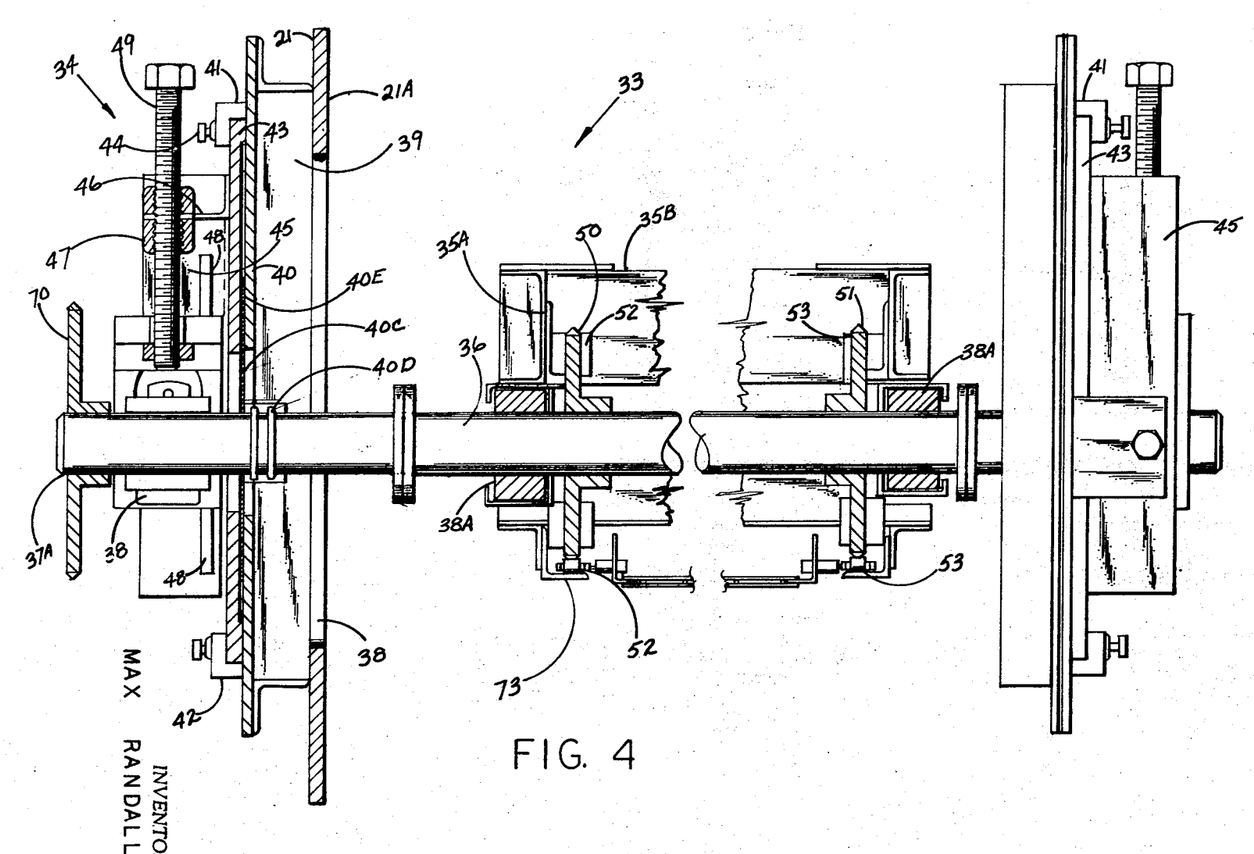
FIG. 4 is a view looking in the direction of line 4—4 on FIG. 3, illustrated partly in section.

As best seen in FIGS. 2 and 4 the arrangement is such that the respective ends 36A and 37A of the respective shafts 36, 37 journaled on the frame are arranged to extend through the side mounting plate 40 of the tunnel housing 21.

Referring to FIG. 4, the extended ends 36A, 37A of the respective shafts 36, 37 are suitably supported on the sidewalls 21A of the tunnel housing for both vertical and/or lateral adjustment. The sidewall 21A of tunnel housing is provided with an aperture or opening 38 covered by plate 40 having an opening for receiving the extended ends 36A, 37A of shafts 36, 37. Circumscribing frame 39 to which the supporting plate 43 is connected to define a closure with a sealed opening for opening 38. Connected to plate 40 are upper and lower guide rail means 41, 42 for supporting therebetween a laterally adjustable slide 43. The slide plate 43 is disposed between the guide rail 41, 42 so as to be laterally adjusted and fasteners or setscrews 44 are provided to secure the slide plate in adjusted position. The actual shaft sealing is accomplished by a seal assembly 40C which seals leakage along the shaft by O-rings 40D and a teflon gasket at 40E. The arrangement is such that the shafts 36,37 are adjustable by adjusting screw 49 and provision made to seal the slot or opening in plate 40 by a slide sealing plate.

Secured to the slide plate 43 is a pair of opposed brackets 45 for connecting therebetween a ledge or plate 46 in which an adjusting nut 47 is retained. The opposed brackets are provided with an opposed guide rail 48 adapted to be received in a complementary keyway formed on the vertical adjustable bearing 38A supporting shaft extensions 36A and 37A respectively. An adjusting screw 49 for effecting vertical adjustment of the respective shaft extensions 36A, 37A is suitably connected to the bearing 38A and threaded to the adjusting nut 47. Thus to effect vertical adjustment of the respective shafts, the adjusting nut can be rotated in one direction or the other, causing the shafts and associated components to be raised or lowered accordingly. It will be understood that a suitable sealing means is interposed between members 40 and 43 to insure proper sealing. The respective shafts may also be laterally adjusted toward and away from each other to provide the necessary tension on the carrier means to be hereinafter described. This is attained by the lateral adjustment effected by the positioning of the slide plate member 43 relative to the supporting guide rails fixed to member 40. It will be understood that each of the opposed ends 36A, 37A of the respective shafts 36, 37 are similarly supported, thereby rendering the shafts either laterally and/or vertically adjustable.

As best seen in FIG. 3, each of the respective shafts 36, 37 adjacent the corresponding inside surface of the tunnel housing 21 has secured thereto a corresponding sprocket or pulley 50, 51 over which an endless flexible carrier 52, 53 is threaded.

Figure 5:
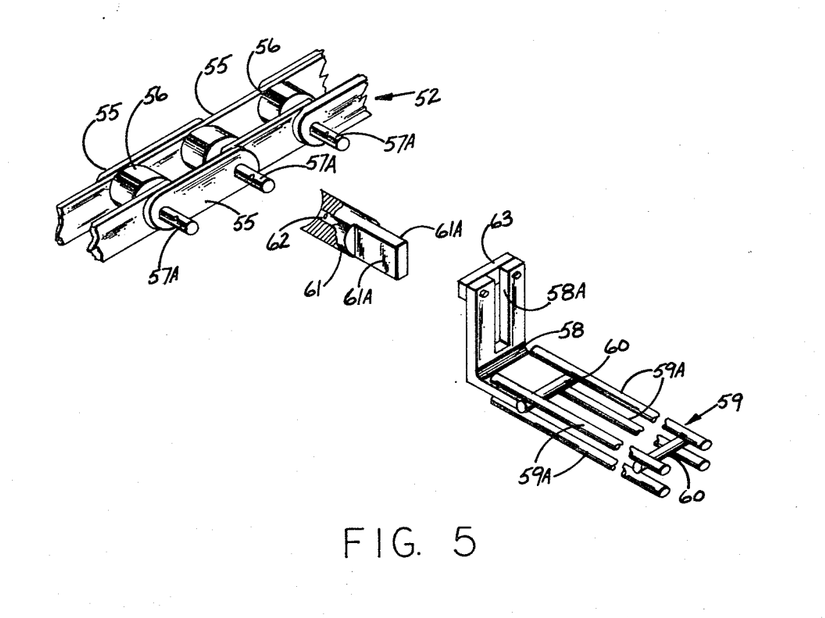
FIG. 5 is a perspective exploded view of a detail of construction of the holddown means of the present invention.

As best seen in FIGS. 3 to 5 the illustrated form of carriers 52, 53 comprise an endless chain of connected links 55 which are threaded over the corresponding pairs of sprockets 50, 51 to define an upper and lower carrier flight portion. As seen in FIG. 5 the adjacent ends of the spaced links 55 are maintained in space relationship by a roller bearing or spacer 56 and the links joined by a link pin 57. As shown each link pin 57 is provided with an extension 57A extending toward the inner portion of the carrier chain 52, 53.

Figure 6:
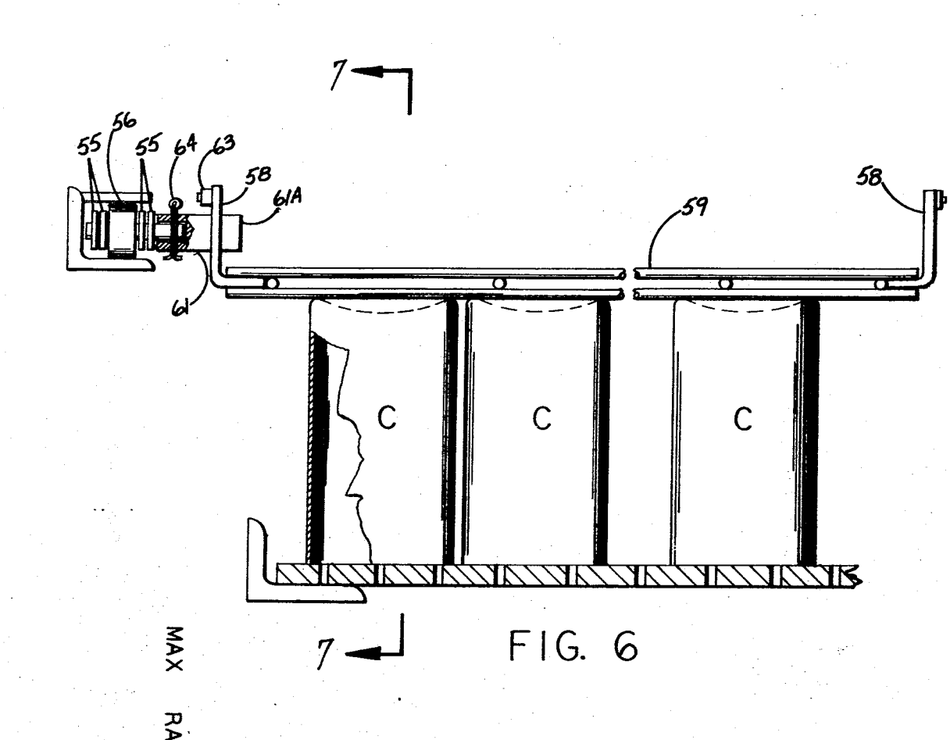
FIG. 6 is a fragmentary transverse section of the holddown means of the present invention.
Figure 7:
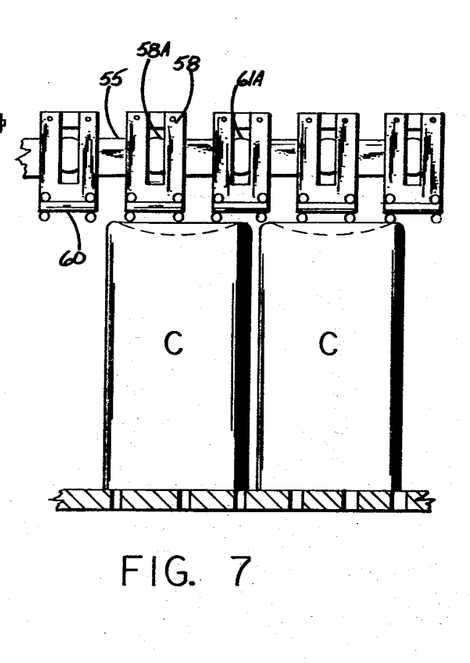
FIG. 7 is an end view taken along line 7—7 on FIG. 6.

A plurality of transversely extending self-adjusting holding grids are connected between the corresponding pin extensions 57A of the respective chain flight portions. Referring more specifically to FIGS. 5 to 7, each holding grid comprises a pair of opposed preferably L-shaped brackets 58 in which the vertical leg is provided with a bifurcated end portion to define an elongated slot 58A. Interconnected to and between the horizontal leg portions of the respective opposed end brackets 58 is a transversely extending grid 59 of open construction. In the illustrated form of the invention the grid is defined by a plurality of spaced elongated rods 59A suitably secured and reinforced by transversely connecting stubs 60. This construction provides a straight lightweight beam with a minimum of area to interfere with the spray. The respective vertical end portions of the brackets 58 are rendered vertically adjusted relative to the extended link pins 57A by means of a bearing guide or pivot 61.

Referring to FIG. 5 the guide or pivot 61 comprises a member having an aperture 62 formed at one end adapted to receive the extended pin portion 57A. The other end of the guide bar or pivot 61 is provided with opposed flat surfaces 61A adapted to be accommodated within the slot 58A defined by the bifurcates of end brackets 58. A transversely extending limit or stop abutment 63 is suitably secured to the upper ends of the bifurcated end bracket to define the limit of movement of the holding grid 59 relative to the bearing guide or pivot 61.

A pin or cotter pin 64, FIG. 6, secures the guide or pivot 61 to the pin extension 57A. It will be understood that the opposed end brackets 58 of the holding grid 59 are similarly constructed, and similarly supported to corresponding opposed link pins 57A.

Figure 5A:
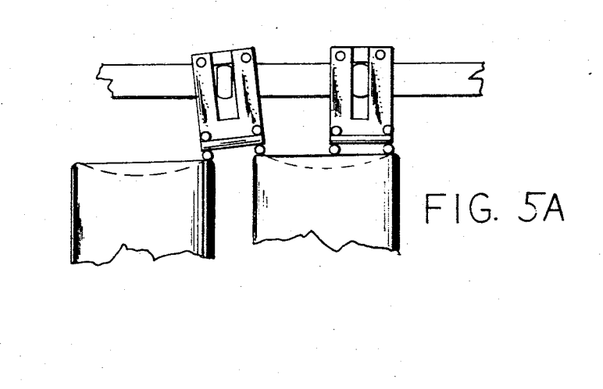
FIG. 5A is a detail of construction illustrating limited lateral movement of a grid element.

With the arrangement described the holding grids 59 and their connection to the respective chain carriers 51, 52 is such that the holding grids 59 are rendered freely movable and vertically self-adjustable with respect to its supporting guide bars or pivots 61. Also the thickness of flats 61A is less than the space or slot 58A of the grids. This permits limited lateral freedom. See FIG. 5A.

The drive of the carrier chains 52, 53 and of the transversely connecting holding grids 59 secured therebetween is synchronized to the drive of the conveyor 22 so that both are traveling in the same direction at precisely the same linear rate of speed. Consequently the relative speed between the movement of the carrier chain and connected holding means and that of the conveyor transporting the articles through the tunnel housing 21 is as close to zero as possible.

The drive of the carrier holddown chain is preferably synchronized to the drive of the conveyor means 22 by means of drive shaft 67 which is operatively connected to the conveyor drive motor 27 through gear output 28. The drive shaft 67 preferably extends longitudinally along the length of the housing as best seen in FIG. 1 so as to provide a common drive for one or more modular units 33. At an intermediate point along the drive shaft 67 there is journaled thereto a worm 68 which meshes with a worm gear driving a pulley 69. Pulley 69 in turn is connected in driving relationship to a sprocket 70 suitably connected to the chain shaft 36 by a chain or belt 71. Accordingly, the chain drive is such that both the chain carrier of the holddown 33 and the conveyor 22 will be driven at the same rate of speed in synchronization by a common motor 27.

The upper and lower support guides or rails 72, 73 are secured to the frame 35 for supporting the weight of an intermediate portion of the carrier chains and connected grid 59. As seen in FIG. 3 guide 73 supports the lower flight of the carrier chains as that it is maintained virtually parallel to the surface of the conveyor means 22.

In operation it will be noted that the relative position of the holding grids 59 with respect to their carrier chains are rendered self-adjustable in that each grid 59 can be automatically adjusted to a particular can size being passed through the cleaning tunnel and allows for any unevenness in the conveyor 22. This is because each grid means 59 is free floating between the respective guide bars 61. As seen in FIG. 6, the arrangement is such that the holding grids 59 will be disposed contiguous to the can top so as to lightly engage the adjacent portion of the can to positively maintain the can in position between the grid 59 of the holding means and the top of the conveyor 22. In this manner the can is positively maintained in an upright position regardless of any vibration and/or forces acting on the rapidly moving cans, while at the same time permitting the cleaning fluid to reach all portions of the can or article. Also whenever a different can size is run within a predetermined size range the holding grid, being free floating is rendered self-adjustable. Thus with the construction described various can sizes can be run without requiring any time loss due to setup heretofore required. See FIGS. 9 to 11.

Figure 8:
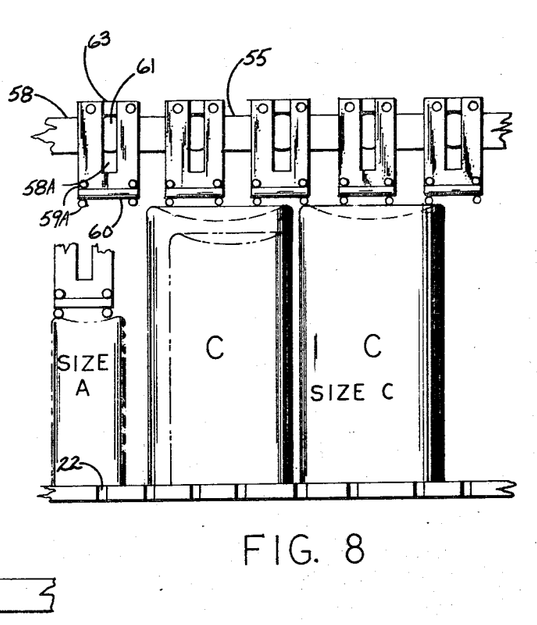
FIG. 8 is a fragmentary end view similar to that of FIG. 7 illustrating the relative relationship of the respective component parts when the carrier assembly is adjusted as a unit with respect to the conveyor.
Figure 12:
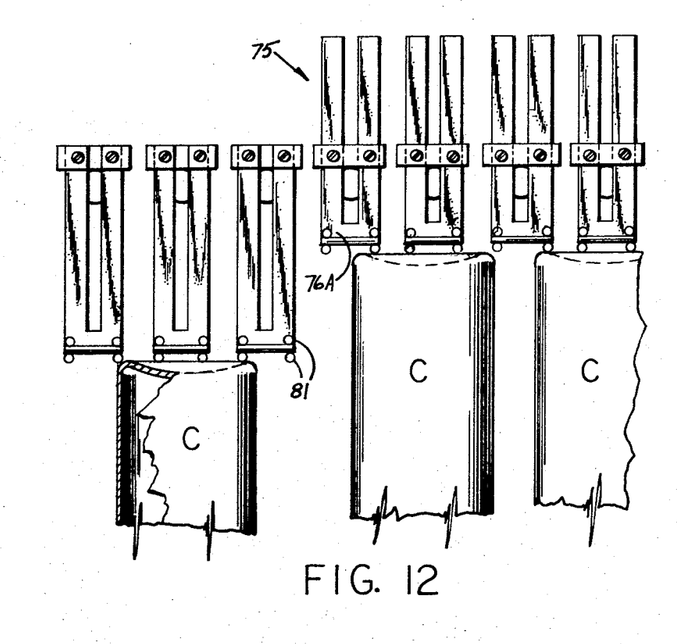
FIG. 12 is a view similar to that of FIG. 11 but illustrating the relative relationship of the component parts when the carrier construction of FIGS. 9—11 is adjusted as a unit relative to the conveyor.

Under certain operating conditions it may be desirable to effect a repositioning of the holding means so that the bottom of the holding grid is slightly touching cans of a size not coming within the range of sizes to which the grids will self-adjust. To effect this adjustment of different ranges of can sizes, means are provided whereby the entire holding means or the carrier assembly is raised or lowered as a unit as the case may be to insure that the carrier grids 59 when riding in their lowestmost position will accommodate the smallest of can sizes. See FIG. 8. This is attained by adjusting the individual adjusting screws 59 which control and support the end bearings 38A of the carrier shafts 36, 37. By proper adjustment of each of the respective adjusting screws 49 operating on the end bearings 38A of the carrier shafts, the entire carrier unit can be raised or lowered accordingly. Consequently as viewed in FIG. 8, the carrier unit can be adjusted as a unit so that the lower ends or the grid 59A of the holding means may be brought into contiguous or contacting relationship to each of the different range of can sizes disclosed. With the construction described the holding grids 59 of the carrier means can be rendered self-adjusting so as to positively engage with the adjacent end portions of the can for a particular range of can sizes; and/or the entire carrier unit may be adjusted so as to raise the lower ends of the grid holding means 59 so as to slightly raise the grid above the respective cans or articles to be cleaned if desired, e.g., as in FIG. 12.

Figure 9:
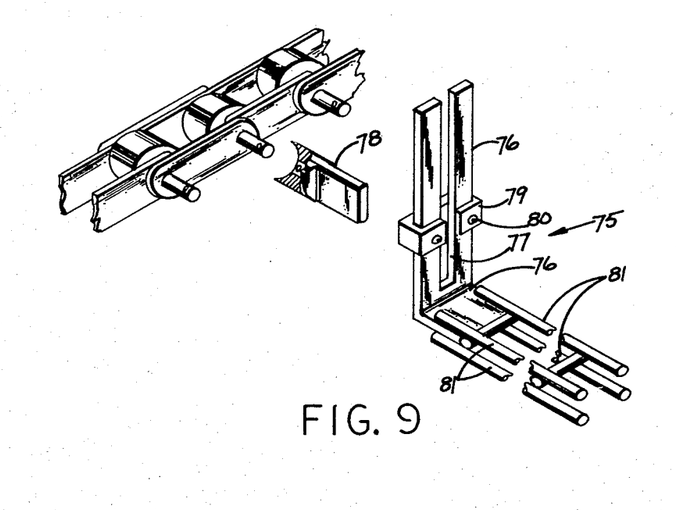
FIG. 9 illustrates a fragmentary detail exploded perspective view of a modified holddown construction.

FIG. 9 illustrates a modified form of the invention. In this form of the invention the cleaning apparatus 20 is substantially similar to that herein described with the exception that the details of the holding grids 75 vary. As best seen in FIG. 9 the holding grids 75 comprise a pair of end brackets 76 as hereinbefore described, in which the vertical leg 76A is rendered substantially longer than the corresponding leg bracket of FIG. 5. The leg 76A of bracket 76 is provided with a bifurcated end portion to define a slot 77 adapted to receive the ends of a guide bar or pivot 78 similar to that described with respect to FIG. 5. In this form of the invention an adjustable limit stop or abutment 79 extends transversely between the bifurcates of the end bracket 76 with means, such as setscrews 80 for securing limit stop in vertically adjusted position. An open grid 81 is supported between opposed brackets 76. In this form of the invention the holding grids 75 are suspended between opposed carrier chains in a free-floating manner similar to that hereinbefore described. Under certain conditions this modified form of the invention can be used to dispense with the adjustable assembly 34 hereinbefore described. With this construction the arrangement is such that varying sized cans can be sequentially fed through the cleaning tunnel without requiring adjustment of the carrier means with respect thereto.

Figure 10:
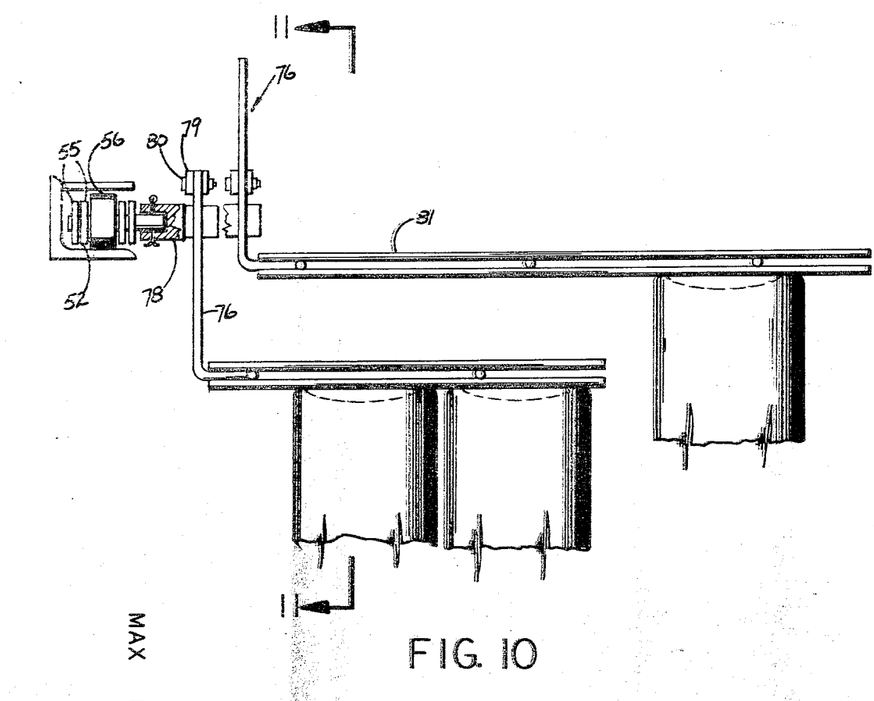
FIG. 10 illustrates a fragmentary assembly view of the construction of FIG. 9.
Figure 11:
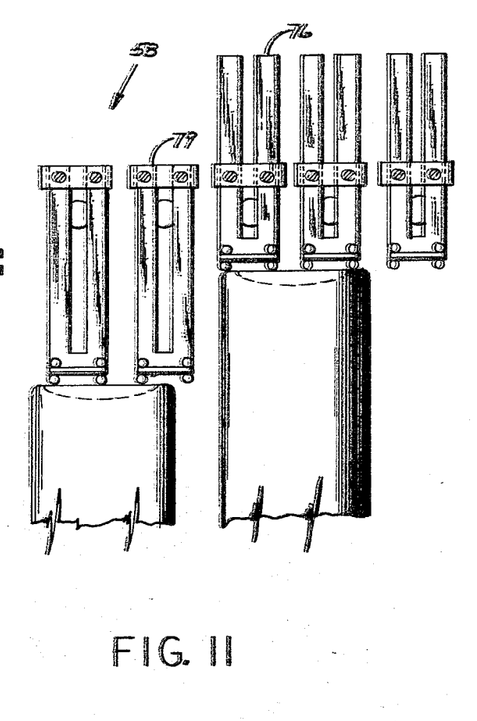
FIG. 11 is an end view of the construction of FIG. 10 taken along line 11—11 on FIG. 10.

In FIGS. 9 and 10 there is illustrated an arrangement whereby the respective holding grids 75 of FIG. 9 can be readily adjusted with respect to varying sized cans. To facilitate the pivoting of the grids 75 about the end sprockets it may be desirable to offset the respective vertical leg portions of every other grid means. By offsetting the opposed leg portions of the grid means on every other holding grid the respective holding grids can be readily moved about the end sprockets in turning about the opposed ends of the carrier means. The offsetting of the respective bracket legs on every other grid means will thus prohibit any interference of adjacent grid means as they go around the end sprockets.

With the construction described the entire carrier chain unit can be vertically adjusted by the screw adjustment 40 operating on each end of the extended sprocket shaft 56, 57 to position the holddown grids in slight spaced relationship from the article as shown in FIGS. 8 to 12. Alternately the carrier chains may be lowered so that the bottoms of the holding grids rest lightly on top of the can and can be rendered free-floating so that they are self-adjusting to particular can sizes.

With the construction described the entire carrier unit may be removed from the housing as a modular unit which will greatly facilitate assembly and disassembly, cleaning and/or repair.

The carrier construction described has the further advantage in that the apparatus can be constructed with liberal tolerances as the adjustment afforded by the described construction can be utilized to control the working tolerances which was heretofore required to be built into a comparable apparatus. Further the respective holding grid means between carrier chains can be readily moved and/or replaced with ease and facility. Also because of the unit modular construction of the carrier means described, one or more may be connected in tandem in a particular housing depending upon the number of spray zones desired therein.

Referring to FIGS. 1 and to FIGS. 12 to 15 an air blowoff means 100 is interposed between successive cleaning stages or holddown means 33 so that the cleaning liquid or solution of the high-pressure spray may be cleared from the recesses usually formed in the can ends. Heretofore it was noted that when air blowoff means were so employed, the air velocity sufficient to displace the liquid also caused the cans to be knocked over. This condition was particularly aggravated as the cans moved beyond the control thereof by the holddown means and into the influence of the blowoff means.

In accordance with this invention an air blowoff means 100 is interposed between stages 33, 33. The blowoff means 100 is constructed to provide an air pattern which stabilizes the can so that the liquid accumulating in the recesses on the can ends can be displaced without tipping the can.

A conventional slot jet has not proven successful because of the turbulent pattern produced which can cause up to a 90° side thrust to the direction of can travel.

It has been discovered that the velocity of the air had to be maintained between definitive limits and also must travel in straight lines to simulate laminar flow. The spacing of the parallel jet slots must also be such that there is a continuity of air impact for more than the diameter of the can so that the water or liquid can roll up and over the edges of the can.

Referring to FIGS. 13 to 16 there is illustrated a preferred form of blowoff means 100 which may be located between successive holddown means 33 as shown in FIG. 1. The air blow down means comprises a hood 101 for containing at least one blower or fan 102. The outlet of the blower 102 connects with a conduit 103 extending between adjacent stages 33. The end of the conduit 103 terminates in a nozzle 104.

Figure 13:
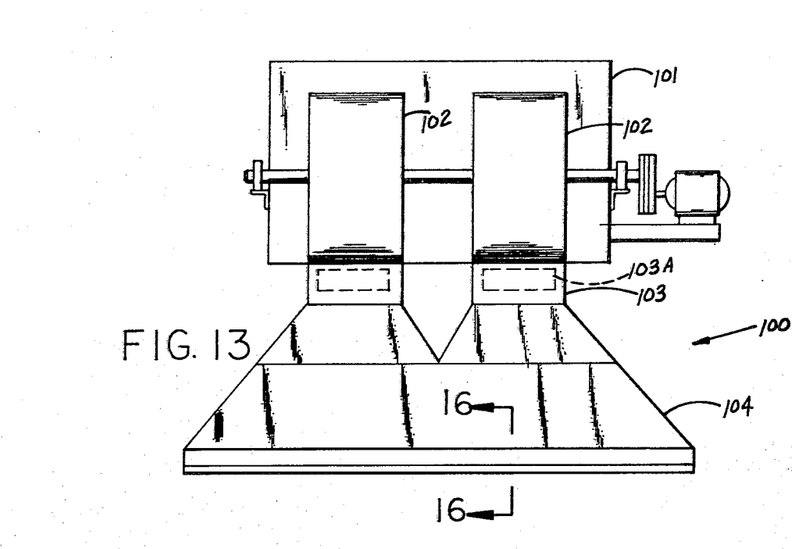
FIG. 13 is a detail end view of an air blow means utilized in the apparatus of this invention.
Figure 14:
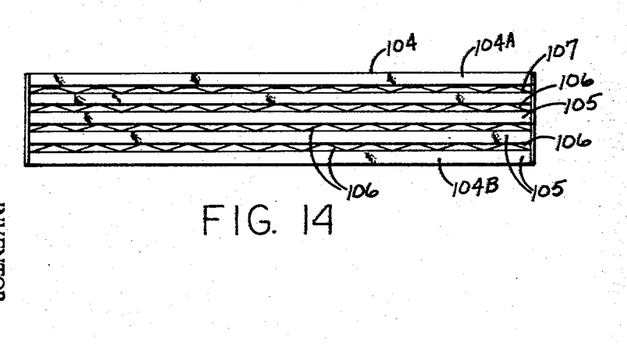
FIG. 14 is a bottom view of the air blow means.
Figure 15:
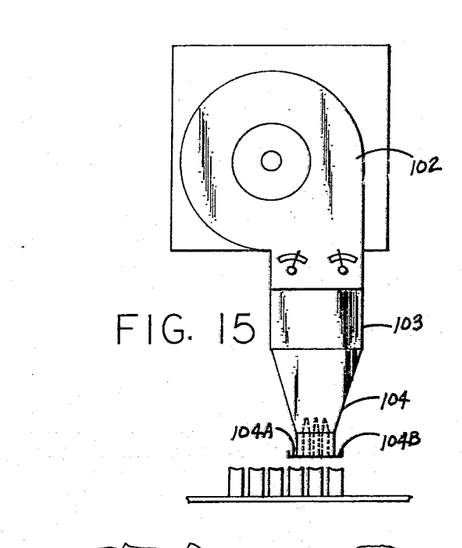
FIG. 15 is a detail of the side elevation view of the air blow means.
Figure 16:
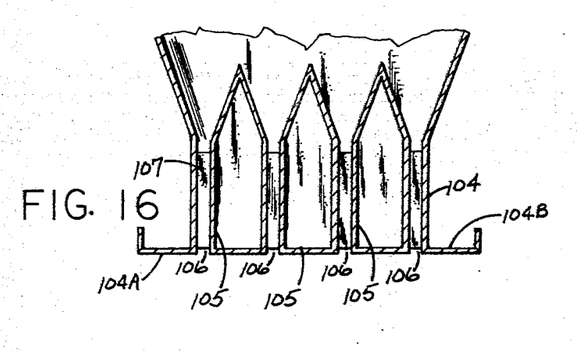
FIG. 16 is an enlarged sectional view taken along line 16—16 on FIG. 13.

As seen in FIG. 13 the nozzle 104 flares outwardly and extends substantially the distance between the sidewall of the tunnel 21. As seen in FIG. 15 the longitudinal axis of the nozzle 104 extends transversely to the direction of can travel. Disposed within the nozzle 104 are a plurality of spaced hollow baffles 105 for defining therebetween a plurality of parallel jet slots 106 through which the airflow generated by the fans 102 is directed in a laminar flow downwardly onto the can bottom. To further insure laminar flow there is disposed in each of the jet slots 106 a corrugated or zigzag insert 107. The corrugations or inserts 107 function to straighten the airflow emitted from nozzle 104. The spacing of the parallel jet slots is also such that there is a continuity of air impact for at least the diameter of the can so the entrapped water can be rolled up and over the edges of the cans.

In addition the leading and trailing edges of the nozzle are provided with a laterally extending flange 104A, 104B which extends outwardly at least one-fourth of a can diameter. Accordingly, the respective flanges 104A, 104B function to further stabilize the can and prohibit the can from tipping, as the can moves beyond the holddown means 33 and into the entrance of the flowoff zone. Thus the flange 104A prohibits the cans from falling over backwards as the cans enter the air zone, and similarly, flange 104B prohibits the cans from falling over forwardly as the cans exit the blowoff zone. Dampers 103A may be provided in the conduit 103 for controlling the amount of airflow therethrough.

While the instant invention has been described with reference to a particular embodiment it will be readily understood and appreciated that variations and modifications of the invention may be made without departing from the spirit or scope of the invention.

I claim:
1. An apparatus for working, cleaning or degreasing articles of manufacture comprising:
   an enclosed housing;
   a traveling conveyor disposed in said housing for transporting therethrough a plurality of discrete articles at a relatively high rate of production;
   high-pressure spray means disposed within said housing for directing a spray of cleansing fluid on the article being transported through said housing;

a holddown means disposed within said housing for maintaining said article in position on said traveling conveyor;
said holddown means including an endless carrier means;
a plurality of holding grid means connected to said carrier means; and
connecting means for securing said holding grids for limited free vertical movement with respect to said carrier means so that said holding grids are rendered self-adjusting to a particular size article being carried on said conveyor.

2. The invention as defined in claim 1 and including means for effecting vertical adjustment between said holddown means and said conveyor to accommodate varying classes of article sizes.

3. The invention as defined in claim 1 wherein said holddown means includes:
a frame, and said carrier means includes a pair of spaced transversely extending shafts rotatably journaled on said frame;
a pair of spaced sprockets mounted on each of said shafts;
an endless chain threaded over corresponding sprockets, each of said chains having corresponding upper and lower flight portions; and
said holding grid means being connected transversely between corresponding flight portions of said chains.

4. The invention defined in claim 3 and including means for driving said conveyor and said chain at substantially the same rate of speed.

5. The invention as defined in claim 3 wherein said holding grid means includes:
a transversely extending grid;
end brackets connected to the opposed ends of said grid;
said end bracket having a bifurcated end portion;
a stop extending transversely of said bifurcated end portion;
said connecting means including a guide bar carried on said chain and extending laterally thereof; and
said guide bar having an extended portion adapted to be received within the bifurcated end portions of said holding grid means.

6. The invention as defined in claim 5 and wherein said chain comprises:
a plurality of connected links;
a roller bearing spaced between the adjacent end of the connected link;
a link pin securing said bearing between the adjacent end of the connected link;
said link pin extending laterally beyond said chain; and
said guide bar having an opening formed in the end thereof for receiving the extended portion of said link pin.

7. The invention as defined in claim 3 and including opposed guide rails connected to said frame adjacent the upper and lower flight portions of said chain for supporting a longitudinal extent thereof.

8. The invention as defined in claim 5 and including means for pivotally connecting said guide bar on said carrier.

9. An apparatus for cleaning articles of manufacture comprising:
an enclosed housing;
a traveling endless conveyor disposed within said housing for rapidly transporting therethrough a plurality of articles to be cleaned;
spray means disposed within said housing for spraying the articles transported therethrough;
means disposed within said housing for maintaining the article in upright position on said conveyor;
said latter means including a frame supported within said housing above the conveyor;
a pair of spaced transversely extending shafts journaled on said frame adjacent the opposed ends of said frame;
corresponding sprocket means mounted on each of said shafts;
an endless chain threaded over corresponding sprockets, said chains having spaced corresponding upper and lower flight portions;
holding means extended transversely between said chains at spaced intervals
said holding means including a grid;
end brackets connected to the opposed ends of said grid;
means for connecting said end brackets to said chains whereby said grids are rendered self-adjusting to hold the article in position on said belt; and
means for driving said conveyor and carrier chain at substantially the same rate of speed.

10. The invention as defined in claim 9 and including means for adjusting the distance between said frame and said conveyor for slightly spacing said holding means from the top of said article.

11. An apparatus for cleaning a plurality of articles comprising:
a housing;
a traveling conveyor disposed within said housing for transporting therethrough a plurality of articles in freestanding position thereon;
means disposed above the conveyor for holding said articles in their respective freestanding position on said traveling conveyor;
means for driving said traveling conveyor and said holding means at substantially the same rate of speed; and
means for rendering said holding means self-adjusting to variable sized articles adapted to be transported on said conveyor.

12. The invention as defined in claim 11 wherein said holding means comprises:
a pair of opposed endless carrier means having corresponding flight portions;
a plurality of holding grid means interconnected between said corresponding flight portions; and
means for pivotally connecting said holding grid means to said flight portions.

13. The invention as defined in claim 12 where said holding grid means comprises:
a pair of end brackets;
each of said end brackets having a longitudinal slot formed therein for accommodating said pivot means;
a grid interconnected between said end brackets; and
means for limiting the adjustment of said end brackets relative to said pivot means.

14. The invention as defined in claim 13 wherein said limiting means is rendered vertically adjustable relative to said slot.

15. The invention as defined in claim 12 and including means for effecting vertical adjustment of said carrier means.

16. The invention as defined in claim 12 wherein said carriers comprise:
a pair of endless chains laterally spaced, said chains including a plurality of connected links; and
link pins for pivotally connecting the end portions of adjacent links, said link pins having an extended portion whereby said extended pin portion defines the pivotal connection for said end brackets.

17. The invention as defined in claim 1 and including:
an air blowoff means disposed down streamwise from said holddown means;
said air blowoff means having a nozzle extending transversely of said conveyor;
means for generating an airflow; and
means disposed in said nozzle to result a laminar airflow emanating therefrom.

18. The invention as defined in claim 17 said nozzle including:
a plurality of parallel slot openings;
said laminar flow means being disposed in said slot opening; and
said latter means including a zigzag baffling plate extending longitudinally of the respective slot openings.

19. The invention as defined in claim 17 said nozzle including laterally flanges along the opposed ends thereof, said flanges being located at substantially the level of said holddown means to stabilize the movement of said articles in transcending from the holddown to the air blowoff means.

20. An air blowoff means comprising:
a hood;
a fan disposed within said hood;
a conduit connecting in communication with the outlet of said fan;
means defining a nozzle connected to the outlet of said conduit;
said nozzle means having a plurality of spaced parallel slotted orifices;
flow straighteners disposed in each of said slotted orifices;
said straighteners comprising a corrugated baffle having the opposed crest portion thereof disposed contiguous the opposed wall portions of said slots; and
outwardly extending flanges connected to the opposed edges of said nozzles.

21. The invention as defined in claim 20 wherein said air blower is adapted to be disposed between a pair of consecutive holddown means.